Patented Nov. 3, 1931

1,829,848

UNITED STATES PATENT OFFICE

PAUL ASKENASY, OF KARLSRUHE, AND OSKAR MERKEL, OF HERNE, GERMANY, ASSIGNORS TO THE FIRM PATENTVERWERTUNGS A. G. "ALPINA", S. A. POUR L'EXPLOITATION DE BREVETS "ALPINA", PATENTS EXPLOITATION CY. "ALPINA" LTD., OF BASEL, SWITZERLAND

CATALYST

No Drawing. Application filed December 6, 1928, Serial No. 324,316, and in Great Britain December 7, 1927.

Our invention relates to catalytic or contact materials and processes, more particularly to materials and processes of this kind for the synthesis of ammonia, but which can also be used in connection with other chemical reactions.

The invention consists in a catalytic or contact material and process for the synthesis of ammonia which material and process are particularly suitable for effecting the combination of hydrogen and nitrogen to form ammonia at low pressures and temperatures.

The catalytic or contact material consists of double compounds of iron with cyanogen and alkalis, alkaline earths or the rare earths together with zirconium oxide and/or other zirconium compounds. The constituents of the catalytic or contact material are mixed and formed—that is to say, they are subjected to a forming process in order to convert the catalyst into the desired final condition.

A preferred method of carrying the invention into effect is set forth in the following example:

A solution of 10 parts of potassium ferrocyanide in 40 parts of water is poured into a solution of 5 parts of zirconium oxychloride in 30 parts of water. The precipitate which is formed may be disregarded and the mixture inclusive of the precipitate may be allowed to stand for some time and evaporated to dryness; or, alternatively, the precipitate may be filtered off and dried. The drying operation is, in either case, preferably carried out at temperatures not exceeding 100° C. During the drying operation the product diminishes in bulk and becomes discoloured. It is then ground to a more or less fine powder and is heated in a stream of hydrogen or of a mixture of hydrogen and nitrogen at temperatures gradually increasing up to about 140° C. at atmospheric pressure for a considerable time, whereby water and the like is driven off; it is then heated gradually up to about 400° C. in a stream of hydrogen and nitrogen at atmospheric pressure, whereupon the pressure of the stream of gases is gradually increased up to about 90 atmospheres (90 kilograms per square centimetre), whilst the temperature is maintained at about 400° C.

The catalytic material thus prepared and formed, if used in the production of ammonia by the combination of hydrogen and nitrogen, is capable of easily producing, even at 400° C. and about 90 atmospheres pressure, from a mixture of hydrogen and nitrogen, a yield of 12 per cent by volume of ammonia with a velocity of flow of 2–3 cubic metres of gas per hour (measured under normal conditions) per kilogram of the dry catalytic agent. It is, however, also possible to obtain a much greater yield of ammonia than this, and to obtain it in a higher degree of concentration.

As stated above, the catalyst containing zirconium gives excellent yields even at very moderate pressures and temperatures so that it is possible to use ordinary steel as the constructional material for the catalyzation apparatus. If desired, alkali salts, salts of alkaline earths or salts of the rare earths and soluble or difficultly soluble iron compounds may be added to the starting material. Furthermore, as already stated, in place of zirconium oxychloride, other zirconium salts, for instance zirconium chloride, may be employed.

It is not necessary, however, to prepare the zirconium oxide or the like at the same time as the other constituents of the catalytic material, as indicated in the example. Instead of this the zirconium oxide or the like may be prepared independently and afterwards mixed with the other constituents of the catalytic material, or, again, zirconium oxide derived from a catalytic agent which has already been used in the synthetic production of ammonia, may be employed after the latter has been entirely or almost entirely freed from its other constituents, preferably by gentle means, such as, for example, treatment with chlorine, chlorine water, weak acids, iron chloride or the like.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. Catalytically active material comprising a combination of zirconium with potassium ferrocyanide.

2. Catalytically active material comprising a combination of zirconium with a double compound of iron, cyanogen and an alkali metal.

3. Catalytically active material comprising a combination of a zirconium compound with potassium ferrocyanide.

4. The process of producing a catalytically active material comprising heating a mixture of potassium ferrocyanide and a zirconium compound in a gas mixture containing hydrogen gradually to about 400° C. under atmospheric pressure and thereafter increasing the pressure while maintaining the temperature at about 400° C.

5. The process of producing catalytically active material as claimed in claim 1, comprising heating a mixture of a double compound of iron, cyanogen and an alkali metal with a zirconium compound in a gas mixture containing hydrogen first gradually to about 140° C., thereafter to about 400° C. at atmospheric pressure, and thereupon increasing the pressure gradually up to a pressure approaching 100 atmospheres while maintaining a temperature of about 400° C.

6. The process of producing catalytically active material as claimed in claim 1, comprising heating a mixture of potassium ferrocyanide and a zirconium compound in a gas mixture containing hydrogen gradually to about 140° C., thereafter to about 400° C. at atmospheric pressure, and thereupon increasing the pressure gradually up to a pressure approaching 100 atmospheres while maintaining a temperature of about 400° C.

7. The process of producing a catalytically active material comprising adding a solution of potassium ferrocyanide to a solution of zirconium oxychloride, drying the precipitate formed, heating same in a gas mixture containing hydrogen gradually first at atmospheric pressure to about 140° C. and then to about 400° C. and finally increasing the pressure to about 90 atms. while maintaining the temperature at about 400° C.

In testimony whereof we affix our signatures.

Dr. PAUL ASKENASY.
OSKAR MERKEL.